No. 820,344. PATENTED MAY 8, 1906.
T. BRIERLEY.
FOLDING SEAT APPLICABLE FOR OUTDOOR USE, THEATERS, AND OTHER PURPOSES.
APPLICATION FILED FEB. 24, 1906.

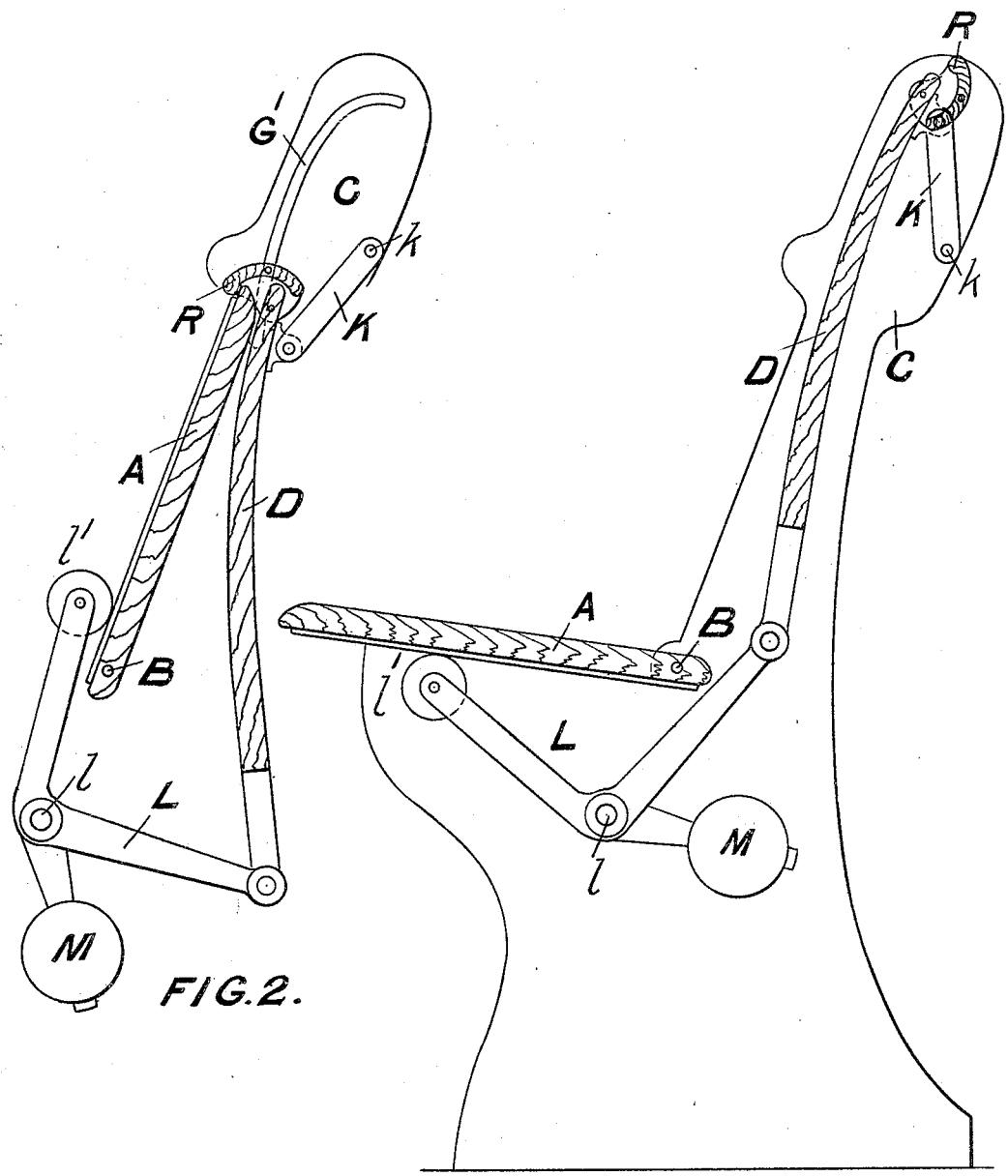

7 SHEETS—SHEET 2.

WITNESSES.
E. Howard
Joseph Bates

INVENTOR.
Thos Brierley

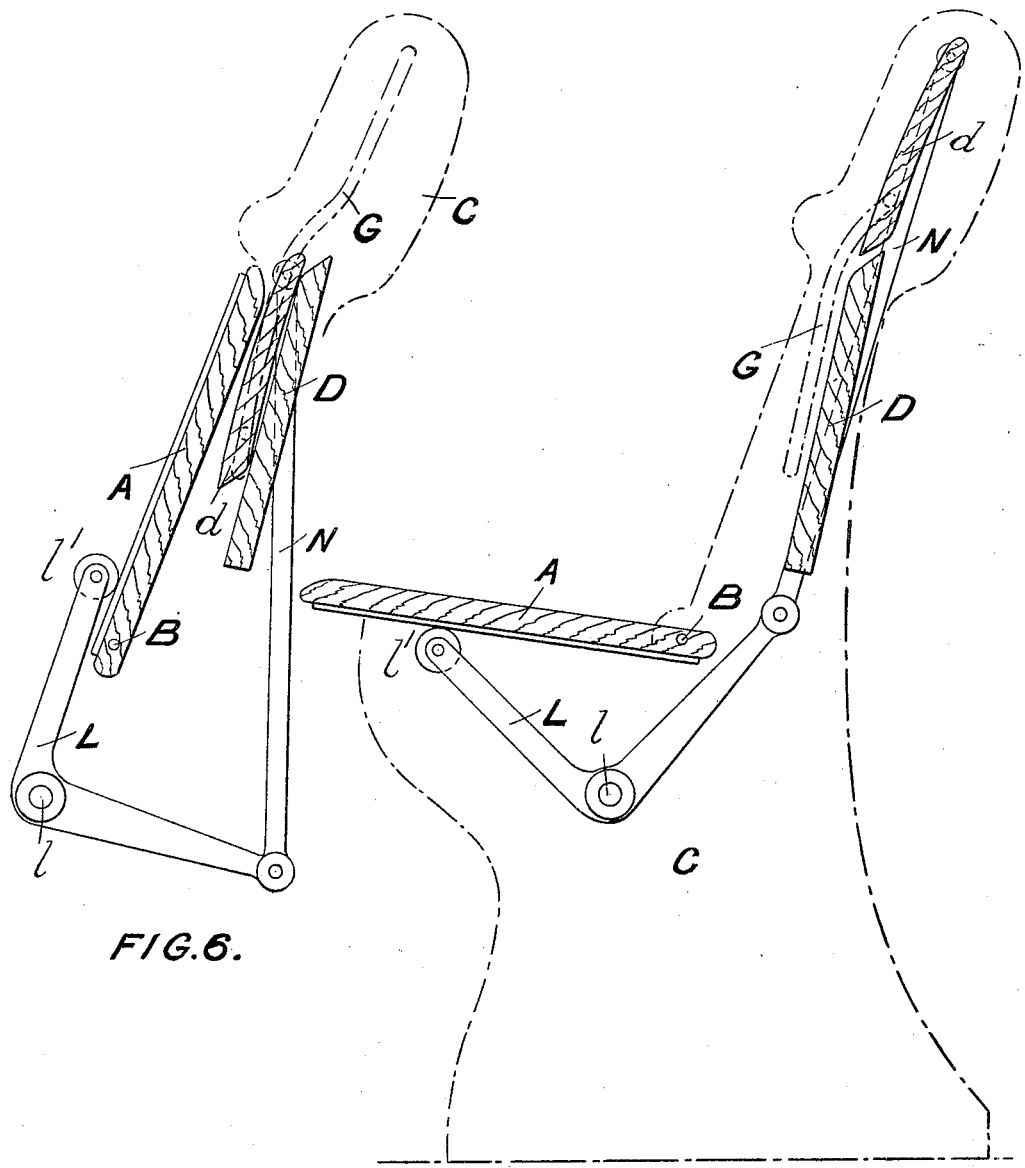

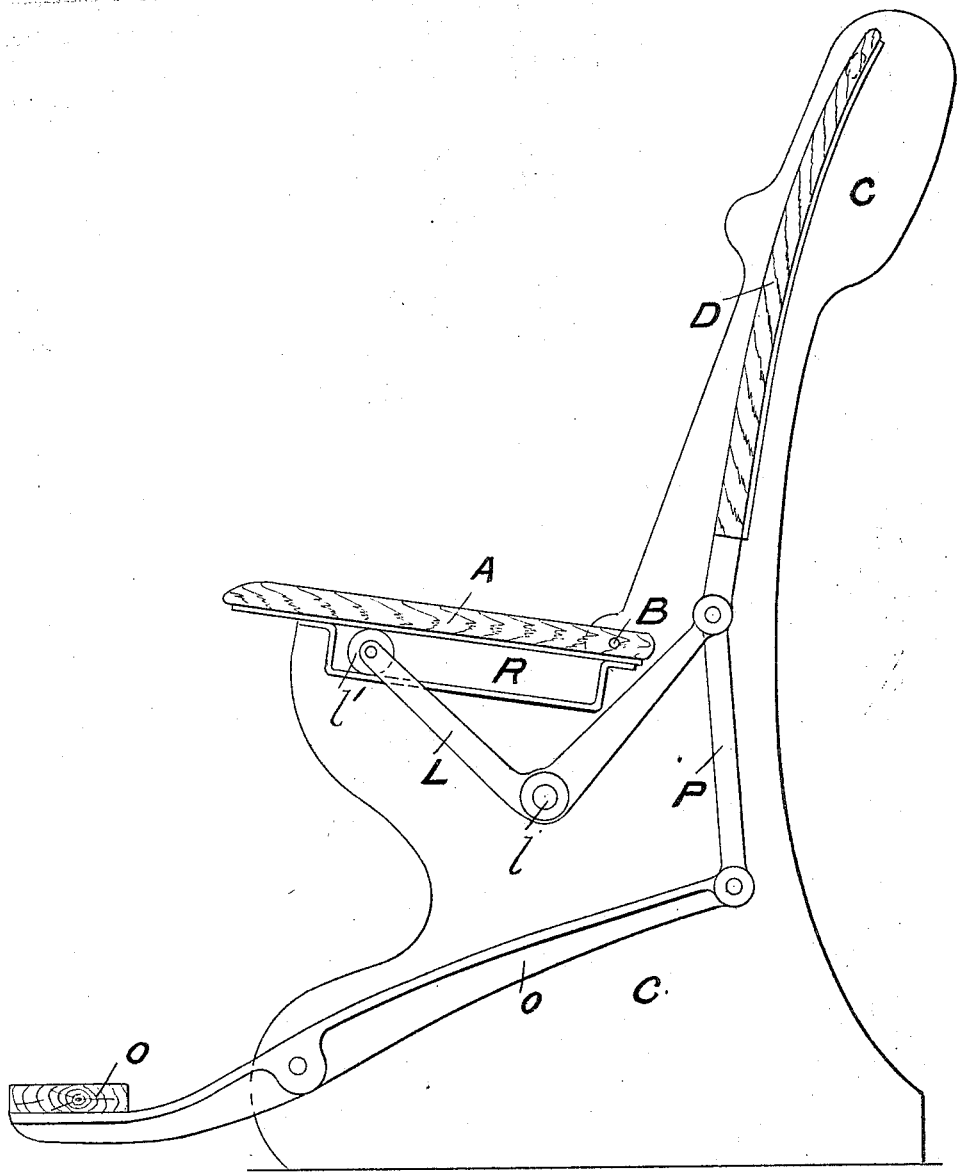

No. 820,344. PATENTED MAY 8, 1906.
T. BRIERLEY.
FOLDING SEAT APPLICABLE FOR OUTDOOR USE, THEATERS, AND OTHER PURPOSES.
APPLICATION FILED FEB. 24, 1906.

7 SHEETS—SHEET 5.

WITNESSES.
E. Howard
Joseph Bates.

INVENTOR.
Thos Brierley

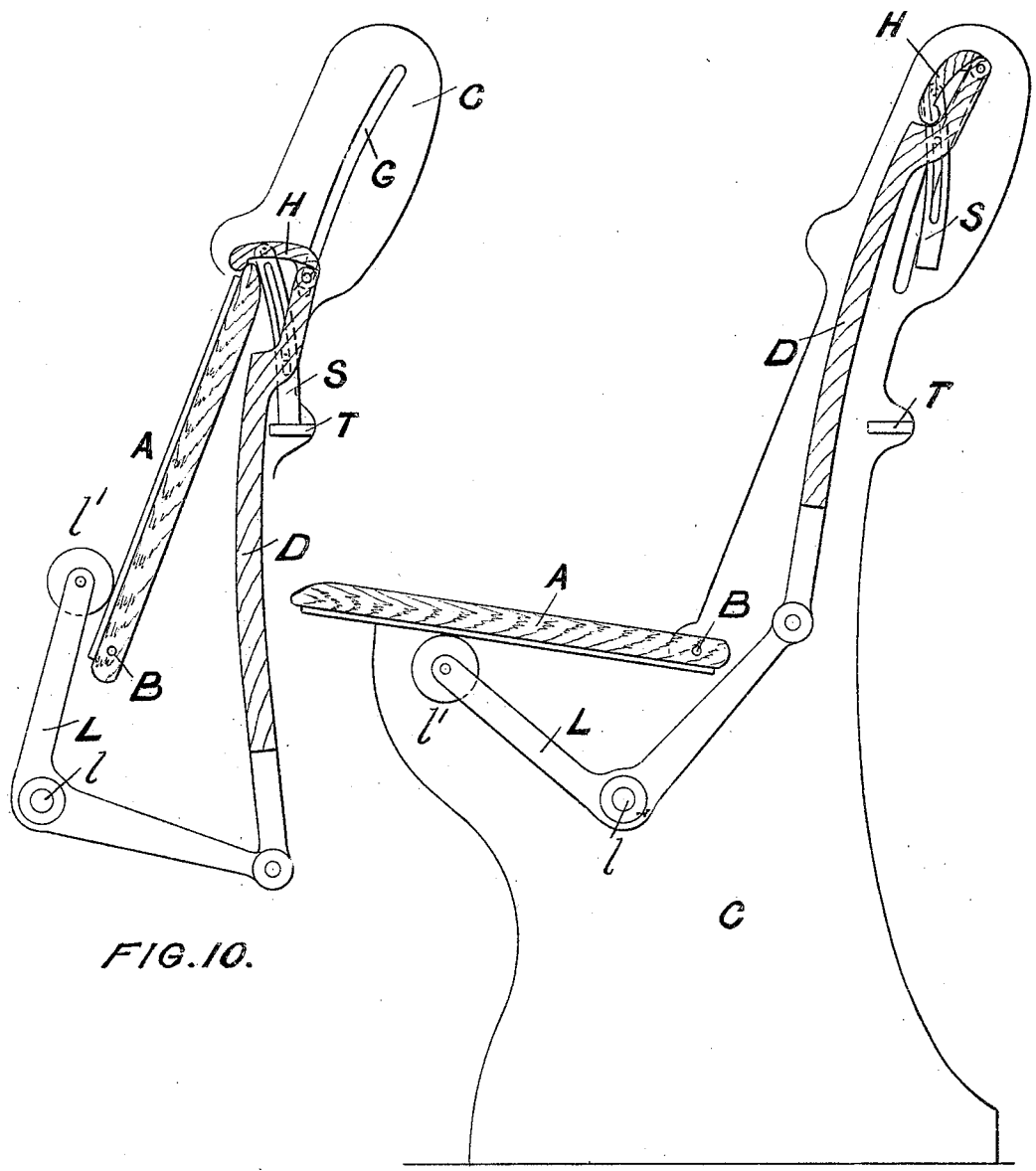

No. 820,344. PATENTED MAY 8, 1906.
T. BRIERLEY.
FOLDING SEAT APPLICABLE FOR OUTDOOR USE, THEATERS, AND OTHER PURPOSES.
APPLICATION FILED FEB. 24, 1906.

7 SHEETS—SHEET 7.

WITNESSES.
E. Howard
Joseph Bates.

INVENTOR.
Thos Brierly

UNITED STATES PATENT OFFICE.

THOMAS BRIERLEY, OF BLACKPOOL, ENGLAND, ASSIGNOR OF ONE-HALF TO HENRY HEAP, OF BLACKPOOL, ENGLAND.

FOLDING SEAT APPLICABLE FOR OUTDOOR USE, THEATERS, AND OTHER PURPOSES.

No. 820,344.     Specification of Letters Patent.     Patented May 8, 1906.

Application filed February 24, 1906. Serial No. 302,748.

*To all whom it may concern:*

Be it known that I, THOMAS BRIERLEY, a British subject, and a resident of Blackpool, county of Lancaster, England, have invented certain new and useful Improvements in Folding Seats Applicable for Outdoor Use, Theaters, and other Purposes, of which the following is a specification.

This invention relates to outdoor seats and seats for public places, theaters, and the like, and is designed to provide a seat which when not in use closes automatically and protects both the seat and the back from rain, dust, dirt, or the like.

It consists, essentially, in constructing the seat in such a manner that when not in use the whole or a part of the back falls by its own weight and by means of suitable levers passing under the seat, which may or may not be weighted, also causes the seat to be raised. A weather or dust guard covering the top of the back and the front of the seat when closed may also be provided, which is also preferably automatic in action.

The invention will be fully described with reference to the accompanying drawings.

Figures 3, 4:
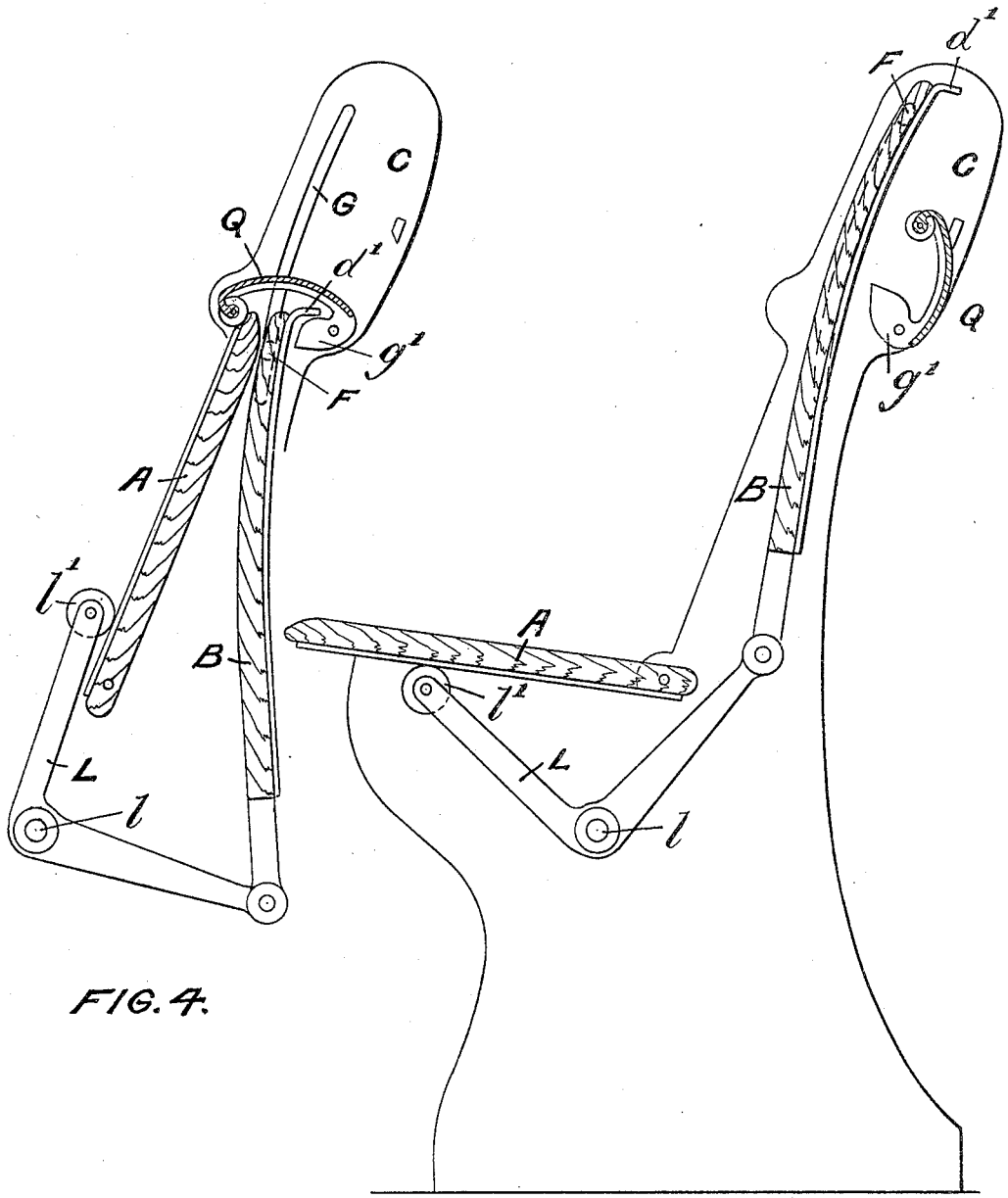
Figure 8:
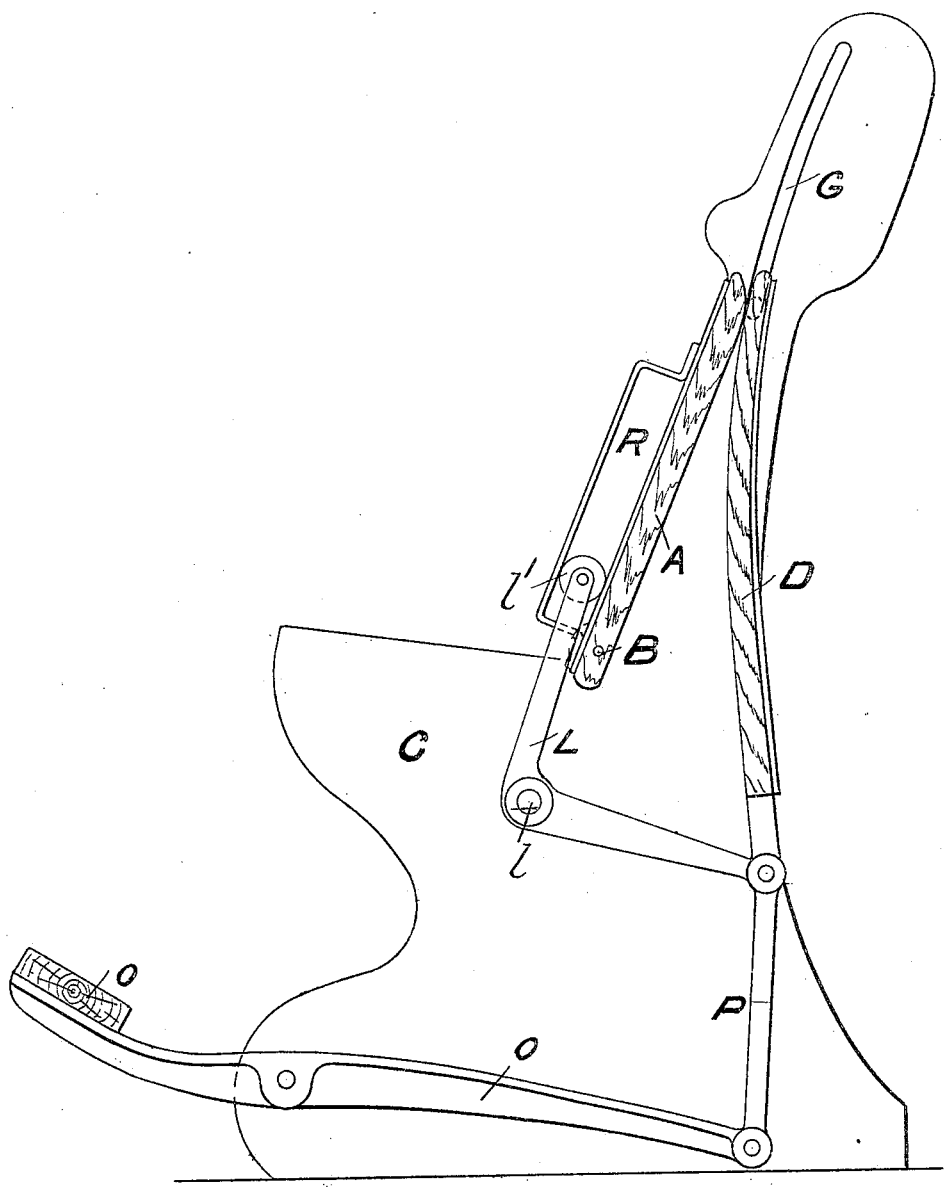
Figure 11:
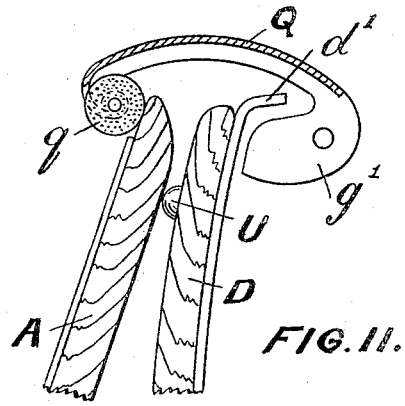
Figure 12:
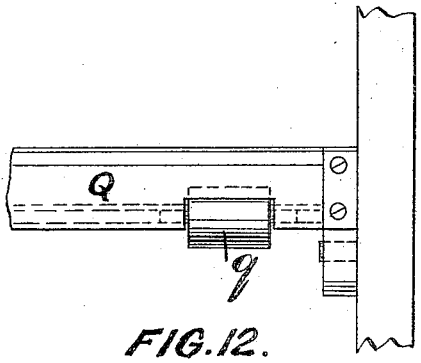
Figure 13:
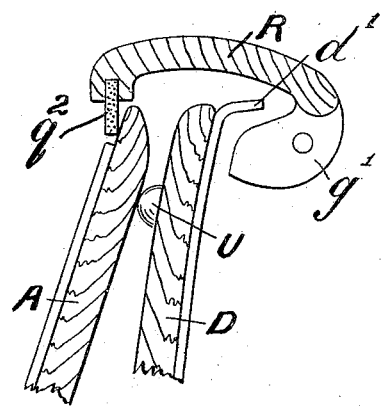
Figure 14:
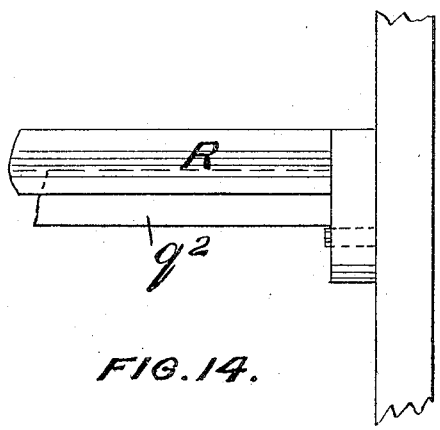

Figure 1 is a longitudinal section of the seat when open. Fig. 2 is a like view with the seat closed. Fig. 3 is a longitudinal section of a modified form with the seat open. Fig. 4 is a like view with the seat closed. Fig. 5 is a longitudinal section of another modification with the seat open. Fig. 6 is a like view with the seat closed. Fig. 7 is a longitudinal section of another modified form with the seat open. Fig. 8 is a like view with the seat closed. Fig. 9 is a longitudinal section of another modification with the seat open. Fig. 10 is a like view with the seat closed. Fig. 11 is an enlarged sectional view of the dust-guard shown in Figs. 3 and 4. Fig. 12 is a front view thereof. Fig. 13 is a sectional view of a modified form of dust-guard, and Fig. 14 is a front view thereof.

The seat A is pivoted at B in any convenient way to the frame C of the seat at either end, and the back D, which is loose between the frame C, is pivotally attached to short links K, pivoted at $k$ to the frame, the links K being of such a length as to permit the back to descend the desired distance in the frame when it closes. To the lower end of the back is pivoted the free end of one arm of a bell-crank or other suitable lever L, which is fulcrumed at $l$ to the frame C. The other arm of said lever L projects toward and in the path of the seat A in such a manner that when the back descends by its own weight it causes the arm of the lever L, to which it is attached, to be lowered, at the same time raising the other arm, which projects toward and engages the seat A, so as to lift and close it against the back D, so that the top of the back and the front of the seat come adjacent to one another. This lever L serves to support the back in addition to the short links K, and the front arm of said lever L may be provided with a roller $l'$, which slides under and also supports the seat when the same is lowered for sitting on. The lowering of the seat A causes the front end of the lever L to be depressed, which raises the back D to the desired position. Stops may be provided to prevent the back moving too far backward. Weights M may be be attached to the lever L if the weight of the back is not found sufficient to raise the seat. Any of the forms of weather or dust guard subsequently described may be employed with this seat.

Instead of the back being connected to the frame by short pivoted links to permit it to rise and fall it may (see Figs. 3 and 4) be provided with pins or projections F, which slide in grooves G, made in the end frames C of the seat. In another form (see Figs. 5 and 6) instead of making the whole of the back movable a part only of it may rise and fall. This part, which is preferably the top $d$, as shown in the drawings, is connected directly or by a connecting-rod N to the bell-crank lever L for closing and supporting the seat and operates as described above.

Instead of opening the seat by pulling it down by hand a foot-board or treadle O (see Figs. 7 and 8) may be provided, connected to the back D by a link P, so that when the treadle O is pressed down the back D is raised and the seat A lowered. In this case the front arm of the lever L under the seat may be formed with runners $l'$, which run in depending brackets R, arranged at the ends of or under the seat A, and said runners are adapted to lower the seat when the back D is raised. The seat closes automatically, as before.

A weather or dust guard or board H, of wood, metal, or other suitable material, (see Figs. 9 and 10,) may be pivoted to the top of the back D of the seat, and when the seat is being used it preferably hangs down over the top of same and is in line with the front of the back which it completes. As the back D is lowered catches S at the end of the guard H engage corresponding pins, stops, or the like T on the frame, which cause the guard H to rise and allow the front edge of the seat to come under it as it comes against the back, so that rain or dust is prevented from getting to the seat or back. In another form (see Figs. 1 and 2) a weather or dust guard R may be pivoted to the top of the back of the seat and is provided with pins or projections which slide in the grooves G', formed in the frame C. As the back of the seat rises to the top the pins are carried round the backwardly-curved upper end of the grooves G', which move the guard R backward and allow the top of the seat to rise above and in front of it. In another form (see Figs. 3 and 4) a weather or dust guard Q is hinged or pivoted to the frame C and is formed with a snug or catch $q'$, which is engaged by a corresponding catch $d'$ on the back of the seat as it is lowered, which causes the guard Q to be turned over the top edge of the back and the front edge of the seat as the former is lowered and the latter is raised to protect the same from dust or rain. Rubber rollers or cushions $q$ (see Figs. 11 and 12) may be provided at the front of the guard to deaden the noise of the shock of the seat against the same, or a strip of rubber $q^2$ (see Figs. 13 and 14) may be employed, running along the whole length of the front of the guard. Rubber buttons or cushions U, fixed in the seat-back D, may also be employed to deaden the noise of the shock of the seat against the back. Any other suitable form of weather or dust guard may be employed, and for indoor seats the guard may be dispensed with, if desired.

What I claim as my invention, and desire to protect by Letters Patent, is—

1. The combination with a seat-frame, of a seat pivoted thereto, a vertically-movable back member arranged between the frame, and a bell-crank lever fulcrumed to the frame below the seat and having the rear arm thereof pivotally connected to said member and its front arm extending in the path of the seat and adapted to shift the seat against said movable member when the latter moves downwardly and to elevate said member when the seat is lowered.

2. The combination with a seat-frame, of a seat pivoted thereto, a vertically-movable back member arranged between the frame, a bell-crank lever fulcrumed to the frame below the seat and having the rear arm thereof pivotally connected to said member and its front arm extending in the path of the seat and adapted to shift the seat against said movable member when the latter moves downwardly and to elevate said member when the seat is lowered, and a guard member automatically movable to inclose the top of said back member and a portion of the seat when the said back member is lowered.

3. The combination with a seat-frame, of a seat pivoted thereto, a vertically-movable back member arranged between the frame, a bell-crank lever fulcrumed to the frame below the seat and having the rear arm thereof pivotally connected to said member and its front arm extending in the path of the seat and adapted to shift the seat against said movable member when the latter moves downwardly and to elevate said member when the seat is lowered, guides for said vertically-movable back member, and a guard member automatically movable to inclose the top of said back member and a portion of the seat when said back member is lowered.

4. The combination with a seat-frame, of a seat pivoted thereto, a vertically-movable back member arranged between the frame, a bell-crank lever fulcrumed to the frame below the seat and having the rear arm thereof pivotally connected to said member and its front arm extending in the path of the seat and adapted to shift the seat against said movable member when the latter moves downwardly and to elevate said member when the seat is lowered, a guard member automatically movable to inclose the top of said back member and a portion of the seat when the said back member is lowered, and a cushioning means carried by the said guard member.

5. The combination with a seat-frame, of a seat pivoted thereto, a counterweighted back member automatically lowered when weight is removed from the seat and automatically elevated when weight is applied to the seat, and a bell-crank lever pivoted to the seat-frame below the seat and having its rear arm pivoted to said back member and its forward arm projecting in the path of the seat and adapted to elevate the seat when the said back member lowers and to elevate the back member when the seat is lowered.

6. The combination with a seat-frame, of a seat pivoted thereto, a counterweighted back member automatically lowered when weight is removed from the seat and automatically elevated when weight is applied to the seat, a bell-crank lever pivoted to the seat-frame below the seat and having its rear arm pivoted to said back member and its forward arm projecting in the path of the seat and adapted to elevate the seat when the said back member lowers and to elevate the back member when the seat is lowered, and a guard member automatically movable to inclose the top of said member and a portion of the seat when the said back member is lowered.

In witness whereof I have hereunto signed my name, in the presence of two subscribing witnesses, this 12th day of February, 1906.

THOMAS BRIERLEY.

Witnesses:
J. OWDEN O'BRIEN,
B. TATHAM WOODHEAD.